United States Patent
Thankappan et al.

(10) Patent No.: US 12,265,632 B2
(45) Date of Patent: Apr. 1, 2025

(54) SYSTEMS AND METHODS FOR KEY DISTRIBUTION OF LOW END SPDM DEVICES

(71) Applicant: Dell Products, L.P., Round Rock, TX (US)

(72) Inventors: Mini Thottunkal Thankappan, Bangalore (IN); Shinose Abdul Rahiman, Bangalore (IN); Rama Rao Bisa, Bangalore (IN); Dharma Bhushan Ramaiah, Bangalore (IN); Vineeth Radhakrishnan, Palakkad (IN)

(73) Assignee: Dell Products, L.P., Round Rock, TX (US)

( * ) Notice: Subject to any disclaimer, the term of this patent is extended or adjusted under 35 U.S.C. 154(b) by 251 days.

(21) Appl. No.: 18/177,156

(22) Filed: Mar. 2, 2023

(65) Prior Publication Data

US 2024/0296234 A1    Sep. 5, 2024

(51) Int. Cl.
G06F 21/60    (2013.01)
G06F 21/33    (2013.01)
G06F 21/85    (2013.01)

(52) U.S. Cl.
CPC .......... *G06F 21/602* (2013.01); *G06F 21/33* (2013.01); *G06F 21/85* (2013.01)

(58) Field of Classification Search
CPC .................................................. G06F 21/602
See application file for complete search history.

(56) References Cited

U.S. PATENT DOCUMENTS

| | | | |
|---|---|---|---|
| 10,949,540 B2 * | 3/2021 | Andrews | G06F 21/602 |
| 2017/0243021 A1 * | 8/2017 | Gupta | G06F 21/6218 |
| 2018/0075242 A1 * | 3/2018 | Khatri | H04L 9/3263 |
| 2019/0332421 A1 * | 10/2019 | Kozlowski | G06F 9/4856 |
| 2020/0259805 A1 * | 8/2020 | Grobelny | G06F 21/85 |
| 2021/0367974 A1 * | 11/2021 | Ponnuru | H04L 63/0823 |
| 2022/0207186 A1 * | 6/2022 | Young | G06F 21/64 |
| 2022/0292203 A1 * | 9/2022 | Severns-Williams | G06F 21/57 |
| 2024/0281538 A1 * | 8/2024 | Radhakrishnan | G06F 21/57 |
| 2024/0291636 A1 * | 8/2024 | Rahiman | H04L 9/3263 |
| 2024/0296234 A1 * | 9/2024 | Thankappan | G06F 21/602 |
| 2024/0296255 A1 * | 9/2024 | Paulraj | G06F 21/725 |

OTHER PUBLICATIONS

"All Published Versions of dsp0274", 2 pages, copyright: 2024. (Year: 2024).*
"Security Protocol and Data Model (SPDM) Specification", Version: 1.0.1, 61 pages, Dated: Mar. 19, 2021. (Year: 2021).*

* cited by examiner

*Primary Examiner* — Ponnoreay Pich
(74) *Attorney, Agent, or Firm* — Fogarty LLP

(57) ABSTRACT

According to embodiments of the present disclosure, a dynamic key distribution system is provided. The dynamic key distribution includes computer-executable instructions to encrypt, using a first Security Protocol and Data Model (SPDM)-enabled device conforming to a SPDM specification, an original Pre-Shared Key (PSK) with a SPDM identity certificate of the first SPDM-enabled device, wherein the original PSK is associated with a second SPDM-enabled device. The instructions are also configured to provision the encrypted PSK in the second SPDM-enabled device, and authenticate the second SPDM-enabled device by decrypting the encrypted PSK to obtain the original PSK using an SPDM protocol.

20 Claims, 3 Drawing Sheets

SYSTEMS AND METHODS FOR KEY DISTRIBUTION OF LOW END SPDM DEVICES

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of trust provided thereby.

SUMMARY

According to embodiments of the present disclosure, a dynamic key distribution system is provided. The dynamic key distribution includes computer-executable instructions to encrypt, using a first Security Protocol and Data Model (SPDM)-enabled device conforming to a SPDM specification, an original Pre-Shared Key (PSK) with a SPDM identity certificate of the first SPDM-enabled device, wherein the original PSK is associated with a second SPDM-enabled device. The instructions are also configured to provision the encrypted PSK in the second SPDM-enabled device, and authenticate the second SPDM-enabled device by decrypting the encrypted PSK to obtain the original PSK using an SPDM protocol.

According to another embodiment, a dynamic key distribution method includes the steps of encrypting, using a first SPDM-enabled device, an original Pre-Shared Key (PSK) with a SPDM identity certificate of the first SPDM-enabled device in which the original PSK is associated with a second SPDM-enabled device. The method further includes the steps of provisioning, using the first SPDM-enabled device, the encrypted PSK in the second SPDM-enabled device, and authenticating, using the first SPDM-enabled device, the second SPDM-enabled device by decrypting the encrypted PSK to obtain the original PSK using a SPDM protocol.

According to yet another embodiment, a computer program product includes computer-executable instructions to encrypt, using a first Security Protocol and Data Model (SPDM)-enabled device conforming to a SPDM specification, an original Pre-Shared Key (PSK) with a SPDM identity certificate of the first SPDM-enabled device in which the original PSK is associated with a second SPDM-enabled device. The instructions may be further executed to provision, using the first SPDM-enabled device, the encrypted PSK in the second SPDM-enabled device, and authenticate, using the first SPDM-enabled device, the second SPDM-enabled device by decrypting the encrypted PSK to obtain the original PSK using an SPDM protocol.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
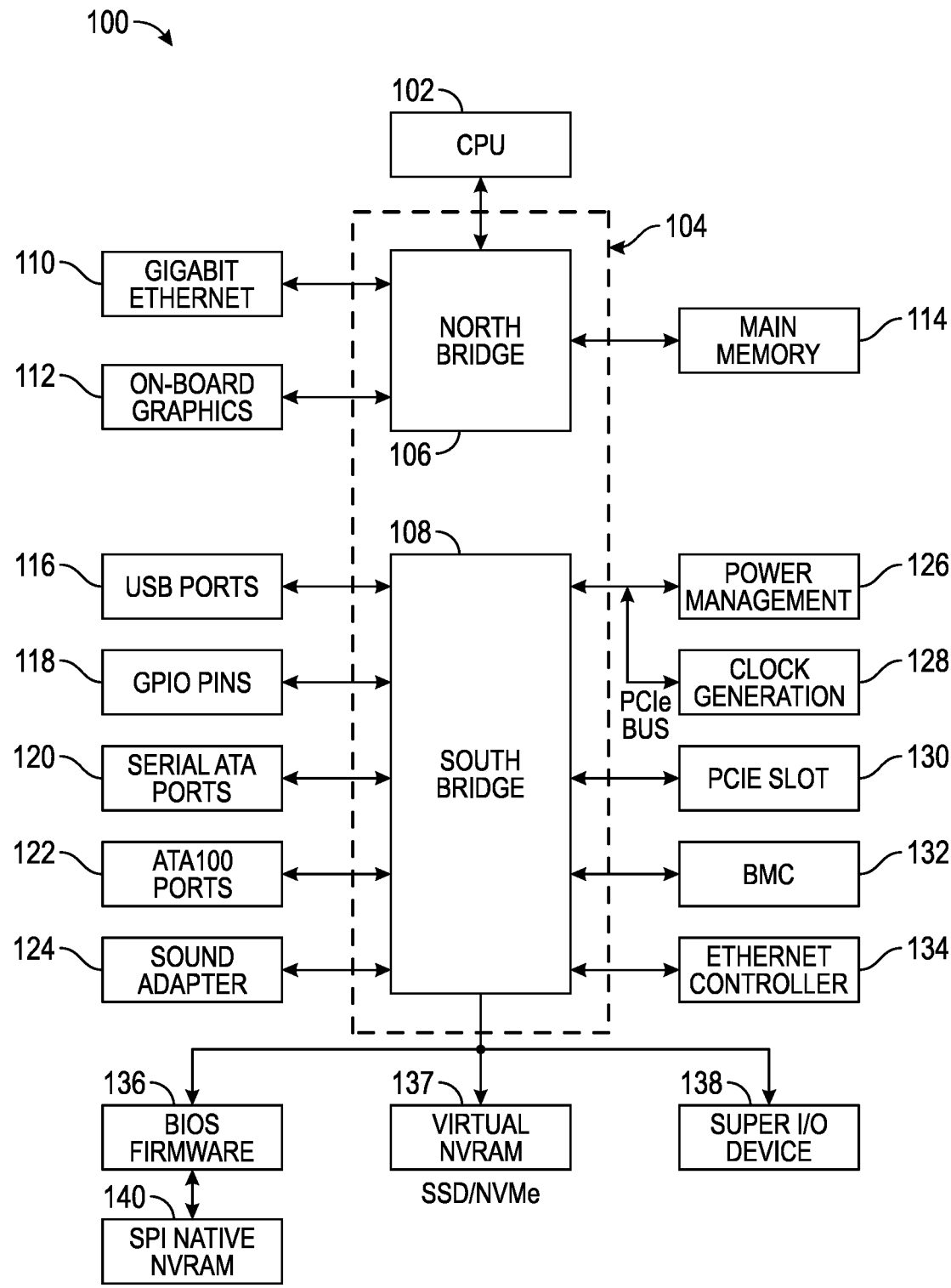
FIG. 1 shows an example of an Information Handling System (IHS) that may be configured to implement a system and method for dynamic key distribution using SPDM according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), and allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

The SPDM protocol is based on certificates for hardware identity verification and firmware measurements. For low end devices such as fan controllers, performing computations using symmetric and asymmetric cryptography can place a relatively large burden on such devices, due to their limited computing power. Moreover, such low end devices are typically based on low end micro controllers that often do not have the computing capacity to perform symmetric and asymmetric cryptographic operations. For these devices, SPDM-based authentication relies on low compute intensive primitives, such as hash functions which may be used. One can use a Pre-Shared Key (PSK) to authenticate the device as a solution to the above problem.

For example, a SPDM requestor requests for the hash of a PSK and nonce from a responder. Once a hash of the PSK and nonce is received, the requester may then recompute the hash with the pre-shared key to authenticate the responder. In a similar fashion, the requester can request the firmware hash to authenticate the responder's firmware. The SPDM standard specifies a mechanism for establishing a secure session using pre-shared keys. Usage of PSKs, nevertheless, may present a problem of key distribution because once the key is known to a would be attacker, not only is the responder no longer safe, but the requester may become compromised when it enters into a trust session with the compromised responder. According to embodiments of the present disclosure, systems and methods for key distribution of low end SPDM devices are provided in which the PSK of a responder is encrypted with a device identity certificate of a requester, and the encrypted PSK provisioned on the responder. Thus, only the requester is capable of authenticating the responder because it is the only entity that can decrypt the PSK. That is, the responder becomes tied to the requester. Additionally, various modes of distributing the PSK from vendor to end user are disclosed.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. Managed devices may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
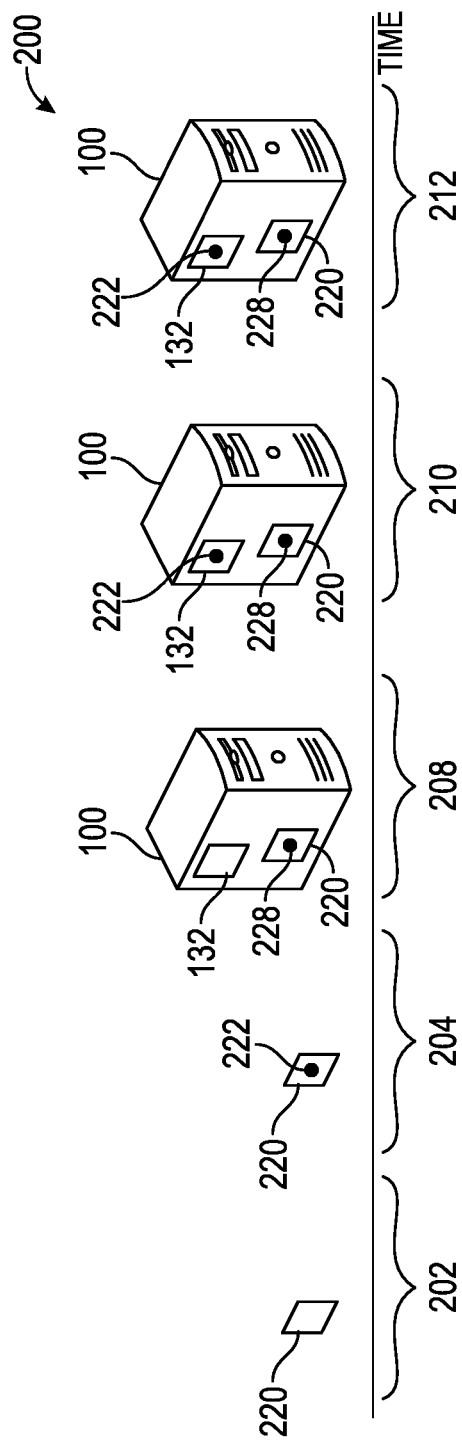
FIG. 2 is a timeline illustrating an example dynamic key distribution system and method that may be used to securely transfer a PSK with a SPDM-enabled device according to one embodiment of the present disclosure.

FIG. 2 is a timeline illustrating an example dynamic key distribution system and method 200 that may be used to securely transfer a PSK with a SPDM-enabled device according to one embodiment of the present disclosure. In particular, the timeline represents several actions that may be taken from a first time period 202 when a SPDM-enabled device 220 is provided from a vendor of the SPDM-enabled device 220 to another time period 210 in which the IHS 100 is functioning with the SPDM-enabled device 220. In one embodiment, the system and method 200 described herein may include an IHS manufacturing process where the SPDM-enabled device 220 is provided to a vendor of the IHS 100 as it is being assembled, such as on an assembly line where the IHS 100 is manufactured. For example, the SPDM-enabled device 220 may be a third party device manufactured by an entity separate and distinct from the manufacturer of the IHS 100.

Although the present embodiment of the system and method 200 is described with an SPDM-enabled BMC 132, it should be appreciated that the key distribution system and method 200 may be used with any type of SPDM-enabled devices for secure transfer of a PSK without departing from the spirit and scope of the present disclosure. The SPDM-enabled device 220 may be any suitable type of device that performs SPDM authentication using a PSK 222. In one embodiment, the SPDM-enabled device 220 includes a low end device with limited processing power, such as a fan controller, a keyboard, a mouse, a battery charger manager, a USB dongle, and the like. In other embodiments, the SPDM-enabled device 220 may be one configured with a single embedded controller.

Initially during a first time period 202, the SPDM-enabled device 220 is provided from its vendor to IHS provider. For example, the SPDM-enabled device 220 is shipped from the vendor of the SPDM-enabled device 220 to the vendor of the IHS 100. At time period 204, the IHS provider verifies PSK provisioned in device using a PSK 222 that was received out-of-band. For example, when the SPDM-enabled device 220 was shipped, the vendor of the SPDM-enabled device 220 may have sent a copy of the PSK to the IHS provider via an e-mail message. Other forms of out-of-band PSK delivery may be used. As an example of PSK verification, the IHS provider may perform a SPDM-based authentication procedure with the SPDM-enabled device 220 using a shop floor test device.

During time period 208, the IHS provider encrypts the PSK 222 with an identity certificate of a BMC 132 configured in the IHS 100, and re-provisions the SPDM-enabled device 220 with the encrypted PSK 228. For example, the IHS provider may insert or install the SPDM-enabled device 220 in the IHS 100 and perform any necessary installation procedures including installing any firmware drivers in the IHS 100, and provisioning the SPDM-enabled device 220 with the encrypted PSK 228. In one embodiment, the identity certificate may be an identity public key of the BMC 132. During time period 210, the IHS provider provisions original PSK 222 of the SPDM-enabled device 220 in the BMC 132. At this point, the SPDM-enabled device 220 is tied to the BMC 132 because only it possesses the private key necessary for decrypting the encrypted PSK 228. Thereafter during time period 212, the IHS is deployed with the SPDM-enabled device 220 and used in the normal manner. Thus as can be seen, the PSK 222 is secured during its distribution because even if the PSK 222 were to be exposed, a would be attacker would not know which SPDM-enabled device it is coupled with because the PSK delivery was performed out-of-band. Additionally, once the SPDM-enabled device 220 is provisioned with the encrypted PSK 228, the only entity that can decrypt it is the owner of the device identity private key, which is known only to the BMC 132.

Figure 3:
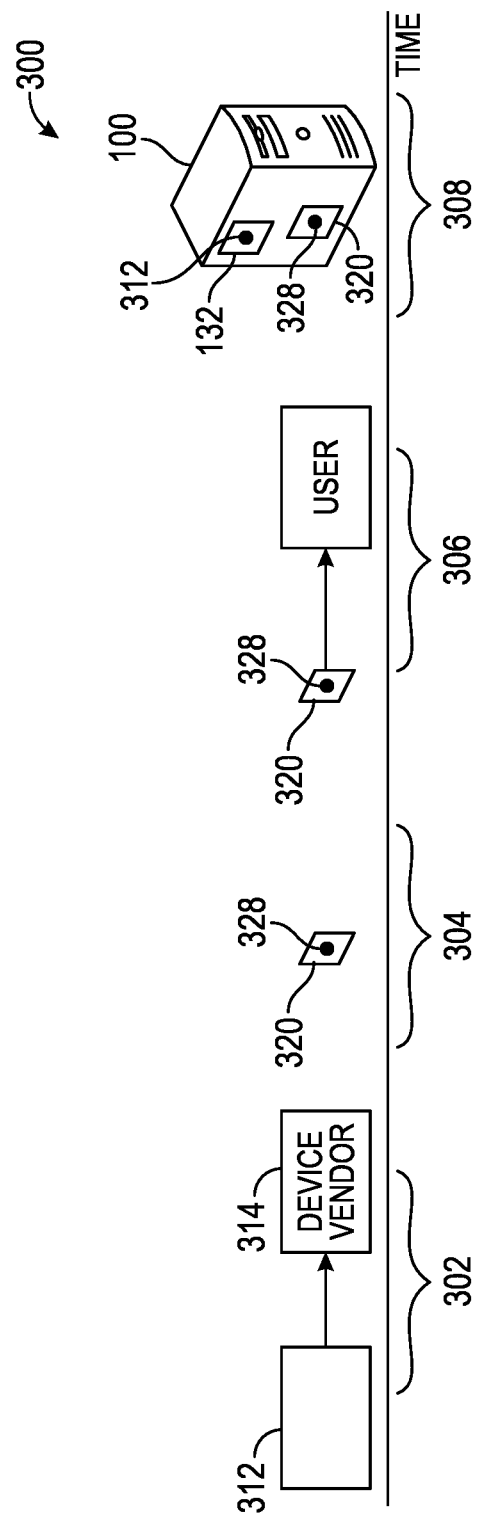
FIG. 3 is another timeline illustrating another example key distribution system and method that may be used to securely transfer a PSK with a SPDM-enabled device according to one embodiment of the present disclosure.

FIG. 3 is another timeline illustrating another example key distribution system and method 300 that may be used to securely transfer a PSK with a SPDM-enabled device according to one embodiment of the present disclosure. In particular, the timeline represents several actions that may be taken from a first time period 302 when a user of the IHS 100 sends a BMC public key to a device vendor to another time period 308 in which the IHS 100 is operating with the SPDM-enabled device 320. In one embodiment, the system and method 300 described herein may include an in-field replacement where the IHS 100 has already been deployed by a user of the IHS 100, and the user desires to add a SPDM-enabled device 320 to the IHS 100 or replace an existing device with the SPDM-enabled device 320.

Initially during a first time period 302, a user of IHS sends an identity certificate 312 of the BMC 132 to a vendor 314 of the SPDM-enabled device 320. The identity certificate 312 may be sent in any suitable manner. For example, the identity certificate 312 may be sent as an attachment to an e-mail message. In one embodiment, the identity certificate 312 may be an identity public key of the BMC 132 configured in the IHS 100. During time period 304, the device vendor 314 encrypts PSK with BMC public key to create an encrypted PSK 328 that is then imparted on the SPDM-enabled device 320. At this point, the SPDM-enabled device 320 is tied to the BMC 132 of the IHS 100 because no entity other than the BMC 132 can decrypt the encrypted PSK 328.

During time period 306, the device vendor 314 ships the SPDM-enabled device 320 to the user, and during time period 308, the user installs the SPDM-enabled device 320 in the IHS 100. In one embodiment, the BMC 132 may, during operation, decrypt the encrypted PSK 328 to retrieve the original PSK and provision it within the BMC 132. Thus, the PSK of the SPDM-enabled device 320 is secured during its distribution because even if it were to be exposed, it is encrypted with the identity certificate 312 of the BMC 132. Also, once the SPDM-enabled device 320 is provisioned with the encrypted PSK 328, the only entity that can decrypt it is the owner of the device identity private key, which is known only to the BMC 132.

Although FIGS. 2 and 3 describe example systems and methods 200 and 300 that may be performed to securely distribute PSKs from a vendor of a SPDM-enabled device to its end user, the features of the systems and methods 200 and 300 may be embodied in other specific forms without deviating from the spirit and scope of the present disclosure. For example, the systems and methods 200 and 300 may perform additional, fewer, or different operations than those described in the present examples. For another example, the systems and methods 200 and 300 may be performed in a sequence of steps different from that described above. As yet another example, certain steps of the systems and methods 200 and 300 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   a first Security Protocol and Data Model (SPDM)-enabled device conforming to a SPDM specification; and
   at least one memory coupled to at least one processor, the at least one memory having program instructions stored thereon that, upon execution by the at least one processor, cause the IHS to:
   encrypt an original Pre-Shared Key (PSK) with a SPDM identity certificate of the first SPDM-enabled device, wherein the original PSK is associated with a second SPDM-enabled device;
   provision the encrypted PSK in the second SPDM-enabled device; and
   authenticate, using an SPDM protocol, the second SPDM-enabled device by decrypting the encrypted PSK to obtain the original PSK.

2. The IHS of claim 1, wherein the PSK is distributed out-of-band relative to how the second SPDM-enabled device is distributed to the IHS.

3. The IHS of claim 2, wherein the PSK is distributed via an e-mail message.

4. The IHS of claim 2, wherein the act of encrypting the PSK, provisioning the encrypted PSK, and authenticating the second SPDM-enabled device is performed by a provider of the IHS.

5. The IHS of claim 1, wherein the SPDM identity certificate comprises a public identity key of the first SPDM-enabled device.

6. The IHS of claim 1, wherein the act of encrypting the PSK and provisioning the encrypted PSK is performed by a vendor of the second SPDM-enabled device, and the act of authenticating the second SPDM-enabled device is performed by a provider of the IHS.

7. The IHS of claim 6, wherein the act of encrypting the PSK is performed using the SPDM identity certificate received from a user of the IHS.

8. The IHS of claim 1, wherein the first SPDM-enabled device comprises a Baseboard Management Controller (BMC) configured in the IHS, and the second SPDM-enabled device comprises a component of the IHS.

9. A dynamic key distribution method comprising:
   encrypting, using a first Security Protocol and Data Model (SPDM)-enabled device conforming to a SPDM specification, an original Pre-Shared Key (PSK) with a SPDM identity certificate of the first SPDM-enabled device, wherein the original PSK is associated with a second SPDM-enabled device;
   provisioning, using the first SPDM-enabled device, the encrypted PSK in the second SPDM-enabled device; and
   authenticating, using the first SPDM-enabled device, the second SPDM-enabled device by decrypting the encrypted PSK to obtain the original PSK using a SPDM protocol.

10. The dynamic key distribution method of claim 9, further comprising distributing the PSK out-of-band relative to how the second SPDM-enabled device is distributed to an Information Handling System (HIS).

11. The dynamic key distribution method of claim 10, further comprising distributing the PSK via an e-mail message.

12. The dynamic key distribution method of claim 10, further comprising encrypting the PSK, provisioning the encrypted PSK, and authenticating the second SPDM-enabled device by a provider of the IHS.

13. The dynamic key distribution method of claim 9, further comprising encrypting the PSK and provisioning the encrypted PSK by a vendor of the second SPDM-enabled device, and authenticating the second SPDM-enabled device by a provider of the IHS.

14. The dynamic key distribution method of claim 13, further comprising encrypting the PSK using the SPDM identity certificate received from a user of the IHS.

15. A computer program product comprising a computer readable storage medium having program instructions stored thereon that, upon execution by an Information Handling System (IHS), cause the IHS to:
   encrypt, using a first Security Protocol and Data Model (SPDM)-enabled device conforming to a SPDM specification, an original Pre-Shared Key (PSK) with a SPDM identity certificate of the first SPDM-enabled device, wherein the original PSK is associated with a second SPDM-enabled device;
   provision, using the first SPDM-enabled device, the encrypted PSK in the second SPDM-enabled device; and
   authenticate, using the first SPDM-enabled device, the second SPDM-enabled device by decrypting the encrypted PSK to obtain the original PSK using an SPDM protocol.

16. The computer program product of claim 15, wherein the act of encrypting the PSK, provisioning the encrypted PSK, and authenticating the second SPDM-enabled device is performed by a provider of the IHS.

17. The computer program product of claim 15, wherein the SPDM identity certificate comprises a public identity key of the first SPDM-enabled device.

18. The computer program product of claim 15, wherein the act of encrypting the PSK and provisioning the encrypted PSK is performed by a vendor of the second SPDM-enabled device, and the act of authenticating the second SPDM-enabled device is performed by a provider of the IHS.

19. The computer program product of claim 18, wherein the act of encrypting the PSK is performed using the SPDM identity certificate received from a user of the IHS.

20. The computer program product of claim 15, wherein the first SPDM-enabled device comprises a Baseboard Management Controller (BMC) configured in the IHS, and the second SPDM-enabled device comprises a component of the IHS.

\* \* \* \* \*